US010287689B2

(12) United States Patent
Yoshida et al.

(10) Patent No.: US 10,287,689 B2
(45) Date of Patent: May 14, 2019

(54) METHOD FOR PRODUCING METAL-PLATED STAINLESS MATERIAL

(71) Applicant: TOYO KOHAN CO., LTD., Tokyo (JP)

(72) Inventors: Takahiro Yoshida, Yamaguchi (JP); Tomoyuki Tsuruda, Yamaguchi (JP)

(73) Assignee: TOYO KOHAN CO., LTD., Tokyo (JP)

( * ) Notice: Subject to any disclaimer, the term of this patent is extended or adjusted under 35 U.S.C. 154(b) by 0 days.

(21) Appl. No.: 15/533,287

(22) PCT Filed: Dec. 3, 2015

(86) PCT No.: PCT/JP2015/083992
§ 371 (c)(1),
(2) Date: Jun. 5, 2017

(87) PCT Pub. No.: WO2016/093145
PCT Pub. Date: Jun. 16, 2016

(65) Prior Publication Data
US 2017/0327953 A1     Nov. 16, 2017

(30) Foreign Application Priority Data

Dec. 12, 2014   (JP) ................................ 2014-251504
Dec. 12, 2014   (JP) ................................ 2014-251505

(51) Int. Cl.
    *C23C 18/18*       (2006.01)
    *C23C 22/50*       (2006.01)
        (Continued)

(52) U.S. Cl.
    CPC ...... *C23C 18/1803* (2013.01); *C23C 18/1844* (2013.01); *C23C 18/1893* (2013.01); *C23C 22/50* (2013.01); *C23F 1/30* (2013.01); *H01M 8/021* (2013.01); *H01M 8/0228* (2013.01); *C23C 18/42* (2013.01); *C23C 18/48* (2013.01); *H01R 13/03* (2013.01)

(58) Field of Classification Search
    USPC ......................................................... 216/108
    See application file for complete search history.

(56) References Cited

U.S. PATENT DOCUMENTS

| 5,433,839 A | 7/1995 | Amelot et al. |
| 2009/0085095 A1 | 4/2009 | Kamath et al. |

FOREIGN PATENT DOCUMENTS

| CN | 101681800 A | 3/2010 |
| CN | 103069629 A | 4/2013 |

(Continued)

OTHER PUBLICATIONS

EPO. European Search Report, dated Aug. 7, 2018.
(Continued)

*Primary Examiner* — Roberts P Culbert
(74) *Attorney, Agent, or Firm* — Muncy, Geissler, Olds & Lowe, P.C.

(57) ABSTRACT

There is provided a method for producing a metal-plated stainless material, the method including performing an acid treatment of treating a stainless steel material with an acidic solution; performing an etching of treating the stainless steel material after the acid treatment with an etching treatment agent; and a modifying the surface of the stainless steel material after the etching into a state suitable for a metal plating process.

12 Claims, 4 Drawing Sheets

(51) Int. Cl.
*C23F 1/30* (2006.01)
*H01M 8/021* (2016.01)
*H01M 8/0228* (2016.01)
C23C 18/42 (2006.01)
C23C 18/48 (2006.01)
H01R 13/03 (2006.01)

(56) References Cited

FOREIGN PATENT DOCUMENTS

| | | |
|---|---|---|
| JP | 59-74269 A | 4/1984 |
| JP | 61-243193 A | 10/1986 |
| JP | 63-195291 A | 8/1988 |
| JP | 6-158384 A | 6/1994 |
| JP | 2007-280664 A | 10/2007 |
| JP | 2008-004498 A | 1/2008 |
| JP | 2011-102411 A | 5/2011 |
| WO | WO-2012/053431 A1 | 2/2014 |
| WO | WO 2014/199526 A1 | 12/2014 |
| WO | WO 2015/041132 A1 | 3/2015 |

OTHER PUBLICATIONS

CNIPA. Chinese Official Action, dated Oct. 18, 2018.
JP Patent Office, Offical Action, Dec. 17, 2018, 5 pages, with English translation (9 pages).

METHOD FOR PRODUCING METAL-PLATED STAINLESS MATERIAL

TECHNICAL FIELD

The present invention relates to a method for producing a metal-plated stainless material.

BACKGROUND ART

As electrical contact materials such as used for connectors, switches, or printed wiring boards, there have conventionally been used a metal-plated stainless material and a surface-treated stainless steel material. The metal-plated stainless material is configured such that the surface of a stainless steel material is coated with a metal plating layer such as a gold plating layer, In such a stainless steel material formed with a metal plating layer at the surface (referred also to as a "metal-plated stainless material," hereinafter), underlying nickel plating may be performed to form an underlying nickel plating layer on the stainless steel material before forming the metal plating layer, in order to improve the interfacial adhesion property of the metal plating layer at the surface. In another known technique, for example, a metal plating layer may be formed directly on a stainless steel material without performing underlying nickel plating, as described in Patent Document 1. As a surface-treated stainless steel material, for example, a stainless steel material formed with a specific oxide film on the surface is known, as disclosed in Patent Document 2.

PRIOR ART DOCUMENT

[Patent Document]
[Patent Document 1] JP2008-4498A
[Patent Document 2] JP2007-280664A

SUMMARY OF INVENTION

Problems to be Solved by Invention

In such a metal-plated stainless material, if the thickness of the metal plating layer at the surface is unduly thin, the coverage of the metal plating layer will be significantly reduced so that the properties required for the metal plating layer cannot be obtained and the stainless steel material may be exposed to deteriorate the corrosion resistance. On the other hand, an unduly thick thickness of the metal plating layer at the surface will lead to disadvantages in cost. To solve such problems in the metal-plated stainless material, therefore, the metal plating layer to be formed at the surface is required to have a thin thickness and achieve uniformity.

However, the above technique as described in Patent Document 1 has a problem in that the nonuniformity in the thickness of the metal plating layer formed on the stainless steel material deteriorates the interfacial adhesion property and corrosion resistance of the metal plating layer. In other words, when the surface of the stainless steel material is exposed to an air atmosphere, a natural oxidation film is generated, but this oxide film has a different thickness in each individual piece of the stainless steel material and the thickness varies even in the same surface of a stainless steel material. The above technique as described in Patent Document 1 does not take into account such variation of the oxide film generated on the surface of the stainless steel material to be used as a substrate. In the metal plating layer formed on the stainless steel material, therefore, the plating may not be deposited on some locations and/or delamination of the metal plating layer may occur. This may cause a problem in that the coverage of the metal plating layer is reduced to deteriorate the properties required for the metal plating layer, such as corrosion resistance, electrical conductivity, and smoothness.

In the above technique as disclosed in Patent Document 2, cathodic electrolysis treatment is performed for a stainless steel material as the surface treatment for the stainless steel material to form a specific oxide film on the stainless steel material thereby to improve the anticorrosion property and the like of the stainless steel material. However, when using a stainless steel material having a complex shape and thus incapable of uniform electrical power distribution and/or when using a stainless steel material in which the electrical resistance of the substrate is high and the electrical power distribution is difficult, problems occur including that the electrical power distribution for the stainless steel material is nonuniform and the oxide film is formed with a nonuniform thickness.

An object of the present invention is to provide a method for producing a metal-plated stainless material in which a metal plating layer formed on a stainless steel material is excellent in the interfacial adhesion property and has a thin and uniform thickness and which can improve the corrosion resistance, electrical conductivity, smoothness, and the like of the metal-plated stainless material, regardless of the individual difference and variety of the thickness of an oxide film generated on the surface of the stainless steel material.

Means for Solving Problems

The present inventors have found that the above object can be achieved by performing specific pretreatment for a stainless steel material and then performing treatment for modifying the surface, and have thus accomplished the present invention.

That is, according to a first aspect of the present invention, there is provided a method for producing a metal-plated stainless material. The production method includes, as pretreatment for a stainless steel material, performing an acid treatment of treating the stainless steel material with an acidic solution and performing an etching of treating the stainless steel material after the acid treatment with an etching treatment agent. The production method further includes modifying a surface of the stainless steel material after the pretreatment into a state suitable for a metal plating process.

In the production method of the present invention, it is preferred to treat the stainless steel material with the acidic solution thereby to form an oxide film. The oxide film may have a lower density than that of a passivation film generated on the surface of the stainless steel material before the treatment with the acidic solution.

In the production method of the present invention, it is preferred to treat the stainless steel material with the acidic solution thereby to grow an oxide film than that before the acid treatment. The oxide film may include the passivation film on the surface of the stainless steel material.

In the production method of the present invention, it is preferred to use, as the acidic solution, a solution that contains any one of hydrochloric acid, ammonium hydrogen fluoride, sulfuric acid, and nitric acid or a mixture thereof.

In the production method of the present invention, it is preferred to use any one of nitric acid and sulfuric acid or a mixture thereof as the etching treatment agent.

In the modifying of the production method of the present invention, it is preferred to perform a process of immersing the stainless steel material in a sulfuric acid aqueous solution at a temperature of 50° C. to 70° C. for 5 to 600 seconds. The sulfuric acid aqueous solution may have a sulfuric acid concentration of 20 to 25 vol %.

The production method of the present invention may preferably further include performing a metal plating for the stainless steel material after the modifying.

According to a second aspect of the present invention, there is provided a method for producing a metal-plated stainless material. The production method includes, as pretreatment for a stainless steel material, performing a film thickness reduction of reducing the thickness of an oxide film generated on the surface of a stainless steel material using an etching agent and performing a film growth of growing the thickness-reduced oxide film using an oxidation treatment agent. The production method further includes modifying the surface of the stainless steel material after the pretreatment into a state suitable for a metal plating process.

In the production method of the present invention, it is preferred to use any one of ammonium hydrogen fluoride, sulfuric acid, nitric acid, and hydrochloric acid or a mixture thereof as the etching agent.

In the production method of the present invention, it is preferred to use any one of nitric acid and sulfuric acid or a mixture thereof as the oxidation treatment agent.

In the modifying of the production method of the present invention, it is preferred to perform a process of immersing the stainless steel material in a sulfuric acid aqueous solution at a temperature of 50° C. to 70° C. for 5 to 600 seconds. The sulfuric acid aqueous solution may have a sulfuric acid concentration of 20 to 25 vol %.

The production method of the present invention may preferably further include performing a metal plating process for the stainless steel material after the modifying.

Effect of Invention

According to the present invention, the stainless steel material is treated with the acidic solution and then purposely etched using the etching treatment agent, and thereafter the process of modifying the surface is performed. This operation results in a uniform thickness of the oxide film on the surface of the stainless steel material, and the metal plating layer formed on the stainless steel material can be excellent in the interfacial adhesion property and can have a thin and uniform thickness. This can provide a method for producing a metal-plated stainless material that is excellent in the properties required for the metal plating layer, such as corrosion resistance, electrical conductivity, and smoothness.

According to another aspect of the present invention, the thickness of the oxide film formed on the surface of the stainless steel material is purposely reduced using the etching agent, and thereafter the thickness-reduced oxide film is grown using the oxidation treatment agent. As a result, the metal plating layer formed can be excellent in the interfacial adhesion property and can have a thin and uniform thickness regardless of the variety in the thickness of the oxide film generated on the surface of the stainless steel material. This can provide a method for producing a metal-plated stainless material that is excellent in the properties required for the metal plating layer, such as corrosion resistance, electrical conductivity, and smoothness.

MODE(S) FOR CARRYING OUT THE INVENTION

Hereinafter, methods for producing a metal-plated stainless material 1 according to embodiments of the present invention will be described.

First Embodiment

Figure 1:
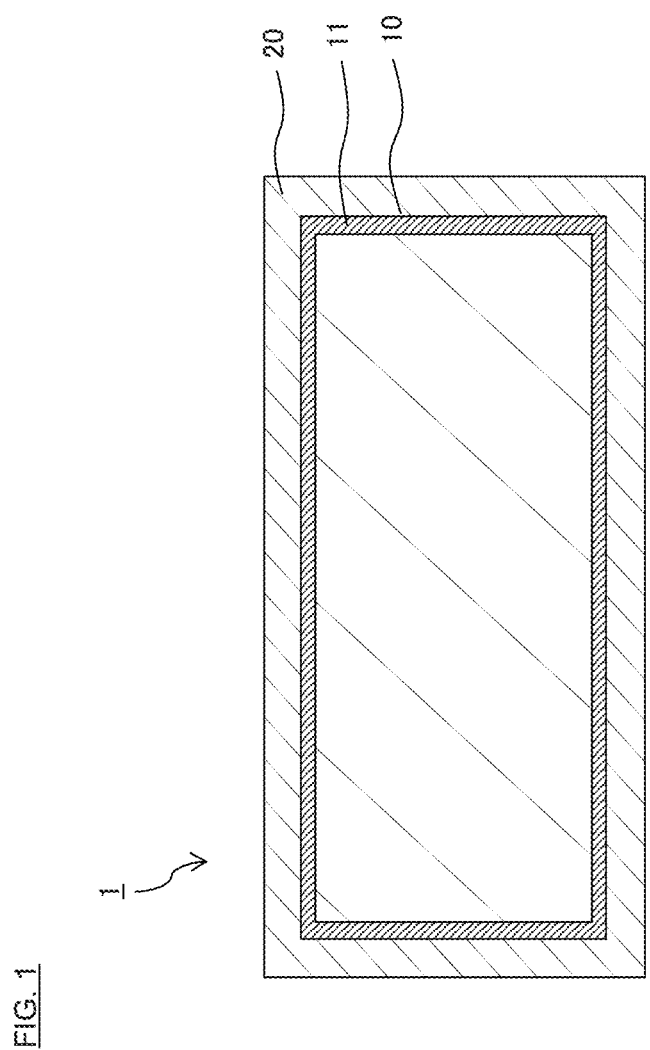
FIG. 1 is a cross-sectional view of a metal-plated stainless material according to first and second embodiments of the present invention.

The metal-plated stainless material 1 of a first embodiment is formed through first performing, as pretreatment, an acid treatment step of treating a stainless steel material with an acidic solution and an etching step of treating the stainless steel material after the acid treatment step with an etching treatment agent and then performing a modification step of modifying the surface of the stainless steel material into a state suitable for a metal plating process and a metal plating step of forming a metal plating layer on the stainless steel material. Thus, the metal-plated stainless material 1 is configured such that, as illustrated in FIG. 1, a metal plating layer 20 is formed on an oxide film 11 that covers a stainless steel material 10.

<Acid Treatment Step>

In the first embodiment, the stainless steel sheet 10 to be a substrate of the gold plate coated stainless material 1 according to the present embodiment is prepared. The stainless steel sheet 10 is not particularly limited. Examples of the stainless steel sheet 10 include those made of stainless steel material, such as SUS316L, SUS316 and SUS304. Various types of stainless steel sheets may be mentioned, such as martensite-based, ferrite-based and austenite-based ones, among which austenite-based stainless steel sheets may be preferred. The shape and form of the stainless steel sheet 10 are not particularly limited, and may be appropriately selected depending on the use. For example, the stainless steel sheet 10 may be used after being worked into a necessary shape or form depending on its use, such as a conductive metal component worked into a linear form or a plate or sheet-like form, a conductive member obtained by working a plate or sheet into an irregular form, and an electronic device component worked into a spring-like or tubular form. The length (or width) and thickness (such as diameter) and sheet thickness (or plate thickness) of the stainless steel sheet 10 is also not particularly limited, and may be appropriately selected depending on the use.

In the first embodiment, for the stainless steel material 10 thus prepared, the acid treatment step for treatment with an acidic solution is performed in control of a predetermined condition. In the first embodiment, the acid treatment step is performed to allow the oxide film 11, which includes a passivation film existing on the surface of the stainless steel material 10 before the treatment with the acidic solution, to have a lower density. Examples of the method of forming the oxide film 11 having such a low density include a method of treating the stainless steel material 10 with the acidic solution to remove specific components from the passivation film, which exists on the surface of the stainless steel material 10 before the treatment with the acidic solution, thereby to form the above oxide film 11. Examples of such specific components include, but are not limited to, iron oxide (such as FeO and $Fe_2O_3$) in the passivation film. Another example of the method of forming the above oxide film 11 having a low density may be a method of treating the stainless steel material 10 with the acidic solution to remove at least a part of the passivation film, which exists on the surface of the stainless steel material 10 before the treatment with the acidic solution, so that the above oxide film 11 is formed as a new oxide film on the surface of the stainless steel material 10.

Figure 2:
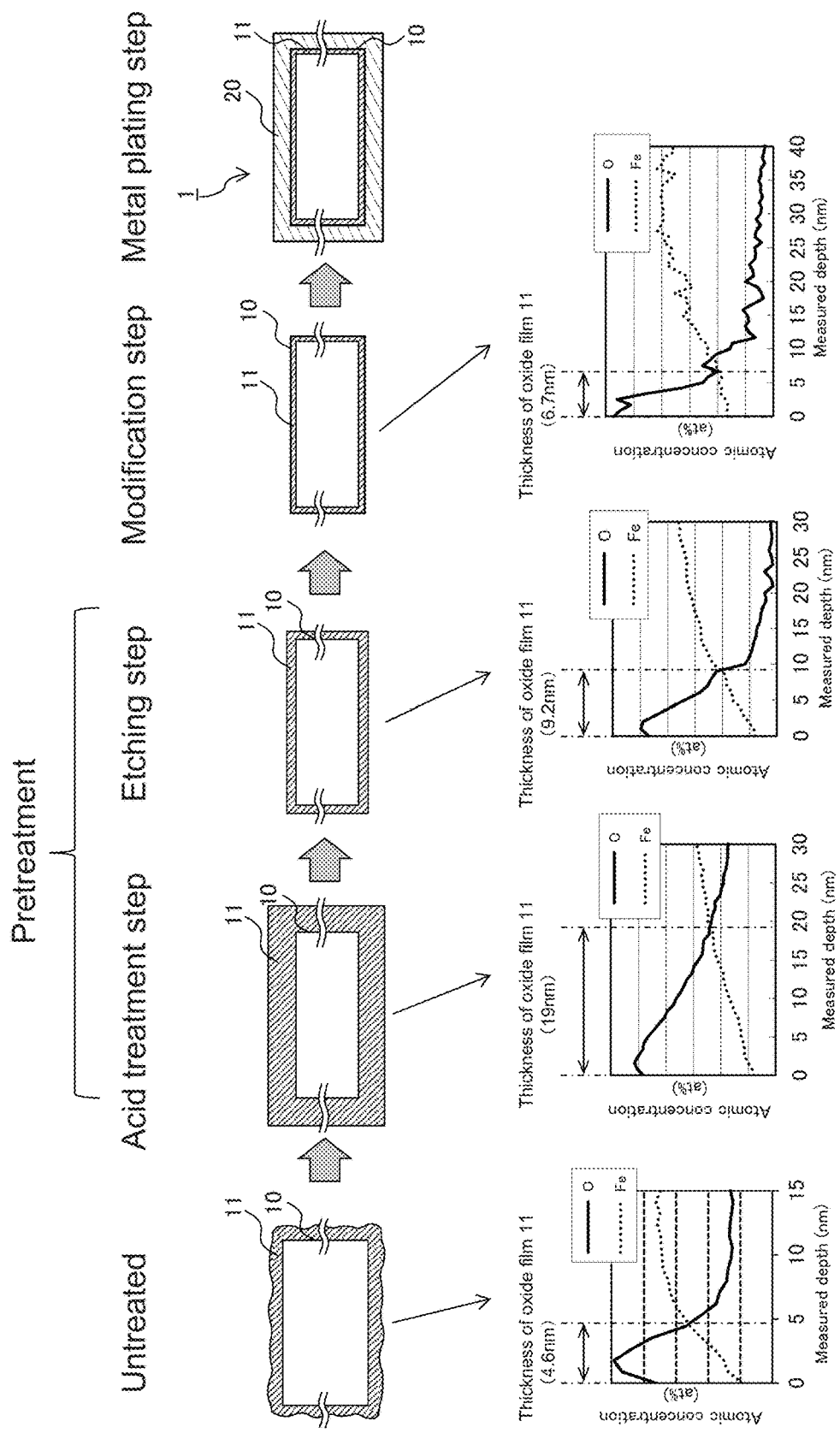
FIG. 2 is a set of views for explaining each step for producing the metal-plated stainless material in the first embodiment of the present invention.

In the first embodiment, when such an oxide film 11 is formed, as illustrated in FIG. 2, a thicker oxide film 11 than the oxide film 11, which includes the passivation film existing before the treatment with the acidic solution, may be formed. In this case, as a result, most of the oxide film on the surface of the stainless steel material 10 will grow. FIG. 2 is a set of views illustrating an example of appearances in which the metal-plated stainless material 1 is formed through the acid treatment step of treating an untreated stainless steel material 10 with the acidic solution, the etching step, the modification step for modification into a state suitable for a metal plating process, and the metal plating step. FIG. 2 also illustrates graphs representing variation in atomic concentrations (at %) of oxygen (O) and iron (Fe) when measurement is performed using a scanning-type Auger electron spectroscopy analyzer (AES) for the stainless steel material 10 after the acid treatment step for treatment with the acidic solution, the stainless steel material 10 after the etching step, and the stainless steel material 10 after the modification step for modification into a state suitable for a metal plating process. In FIG. 2, each vertical axis represents the atomic concentration of oxygen (O) or iron (Fe) while each horizontal axis represents the depth when measured from the surface of the stainless steel material 10 using the scanning-type Auger electron spectroscopy analyzer (AES).

In the first embodiment, the treatment is performed in the above manner to bring the prepared stainless steel material 10 (denoted by "Untreated" in FIG. 2) into contact with the acidic solution and the oxide film 11 can thereby be formed at the surface, as illustrated in FIG. 2. That is, with reference to the graphs obtained in the example of FIG. 2 through the measurement using the scanning-type Auger electron spectroscopy analyzer (AES), the thickness of the oxide film 11 increases from 4.6 nm in the untreated state to 19 nm after the step of treatment with the acidic solution, provided that the thickness of the oxide film 11 is represented by the depth at a position in which the atomic concentration of oxygen (O) falls below the atomic concentration of iron (Fe).

In the first embodiment, as described above, the oxide film 11 is formed using the acidic solution and the thickness of the oxide film 11 can thereby be uniform. This will be more specifically described. As illustrated in FIG. 2, in the untreated stainless steel material 10, the thickness of the oxide film 11 including the passivation film is nonuniform and, therefore, parts with a thinner passivation film are further readily oxidized while parts with a thicker passivation film are less likely to be oxidized. In contrast, when the surface of the stainless steel material 10 is purposely oxidized to form the above-described oxide film 11 using the acidic solution, the growth of the oxide film 11 to be formed at the parts of the stainless steel material 10 in which the oxidization is easy (parts with a thinner passivation film) progresses while the growth of the oxide film 11 to be formed at the parts in which the oxidization is difficult (parts with a thicker passivation film) is suppressed. It is considered that, as a result, the entire surface of the stainless steel material 10 is evenly oxidized and the oxide film 11 on the stainless steel material 10 can have a uniform thickness.

In the first embodiment, the oxide film 11 formed by the acid treatment step for treatment with the acidic solution has properties that it can be relatively easily removed using an etching agent in the etching step which will be described later. This appears to be because the oxide film 11 formed by the acid treatment step for treatment with the acidic solution has a low density to such an extent that the oxide film 11 can be released using adhesive tape. In the first embodiment, such an acid treatment step for treatment with the acidic solution and the etching step are performed, and the thickness of the oxide film 11 on the surface of the stainless steel material 10 can thereby be purposely uniform. Thus, according to the first embodiment, a metal plating layer 20 can be successfully formed on the obtained stainless steel material covered with the oxide layer and it is possible to produce a metal-plated stainless material 1 that is excellent in the corrosion resistance, electrical conductivity, smoothness, and the like which are required for the metal plating layer 20.

The acidic solution used in the acid treatment step for treatment with the acidic solution is not particularly limited, provided that it can reduce the density to such an extent that the oxide film 11 can be released using adhesive tape. It is preferred to use any one of hydrochloric acid, ammonium hydrogen fluoride, sulfuric acid, and nitric acid or a mixture thereof, among which hydrochloric acid is particularly preferred.

In the acid treatment step for treatment with the acidic solution, aqueous solution of the above acidic solution is brought into contact with the stainless steel material 10 and the surface of the stainless steel material 10 can thereby be oxidized. The concentration of the acidic solution in the aqueous solution is preferably 1 to 99 wt % and may be adjusted to a concentration suitable for use in accordance with the type of the acidic solution. In particular, when the treatment is performed using hydrochloric acid, the concentration is preferably 10 to 35 wt % and more preferably 15 to 25 wt %. The concentration of the acidic solution within the above range allows the surface of the stainless steel material 10 to be appropriately oxidized.

It suffices that the method of bringing the stainless steel material 10 into contact with the acidic solution is a method with which the oxide film 11 can be appropriately formed to have a uniform thickness as much as possible. Examples of such a method include a method of immersing the stainless steel material 10 in the aqueous solution of the acidic solution and a method of spraying the aqueous solution of the acidic solution to the stainless steel material 10.

When the stainless steel material 10 is immersed in the aqueous solution of the acidic solution, the temperature of the aqueous solution is preferably 40° C. to 80° C. and more preferably 50° C. to 65° C. The time for immersing the stainless steel material 10 in the aqueous solution of the acidic solution is preferably 5 to 120 seconds and more preferably 10 to 60 seconds.

<Etching Step>

Subsequently, treatment of the etching step is performed to reduce the thickness of the oxide film 11, as illustrated in FIG. 2, through bringing the etching agent into contact with the stainless steel material 10 on which the oxide film 11 is formed by the acid treatment step.

In the first embodiment, the treatment is performed in the above manner to bring the stainless steel material 10 after the acid treatment step into contact with the etching agent in control of a predetermined condition, and the thickness of the oxide film 11 at the surface can thereby be reduced, as illustrated in FIG. 2. That is, with reference to the graphs obtained in the example illustrated in FIG. 2 through the measurement using the scanning-type Auger electron spectroscopy analyzer (AES), the thickness of the oxide film 11 decreases from 19 nm after the acid treatment step to 9.2 nm after the etching step, provided that the thickness of the oxide film 11 is represented by the depth at a position in which the atomic concentration of oxygen (O) falls below the atomic concentration of iron (Fe).

The etching agent used in the etching step is not particularly limited, but it is preferred to use any one of nitric acid and sulfuric acid or a mixture thereof, among which nitric acid is particularly preferred.

In the etching step, aqueous solution of the above etching agent is brought into contact with the stainless steel material 10, and a part of the oxide film 11 on the surface of the stainless steel material 10 can thereby be removed. The concentration of the etching agent in the aqueous solution is preferably 5 to 30 wt % and more preferably 10 to 25 wt %. When the concentration of the etching agent is within the above range, the thickness of the oxide film 11 of the stainless steel material 10 can be appropriately reduced and the thickness of the oxide film 11 remaining on the stainless steel material 10 can be uniform.

It suffices that the method of bringing the stainless steel material 10 into contact with the etching agent is a method with which the thickness of the oxide film 11 can be appropriately reduced while remaining uniform as much as possible. Examples of such a method include a method of immersing the stainless steel material 10 in the aqueous solution of the etching agent and a method of spraying the aqueous solution of the etching agent to the stainless steel material 10.

When the stainless steel material 10 is immersed in the aqueous solution of the etching agent, the temperature of the aqueous solution is preferably 20° C. to 60° C. and more preferably 25° C. to 40° C. The time for immersing the stainless steel material 10 in the aqueous solution of the etching agent is preferably 1 to 30 seconds and more preferably 2 to 15 seconds.

In the first embodiment, when a part of the oxide film 11 is removed in the etching step, it is preferred not to expose the base iron of the stainless steel material 10 (a base portion of the stainless steel material 10 that is not oxidized to be the oxide film 11). This will be more specifically described. If the base iron of the stainless steel material 10 is exposed, the exposed portion will come into contact with oxygen in the air and/or oxygen in water to naturally generate a new oxide film 11. Such a naturally-generated oxide film 11 is liable to have a nonuniform thickness. In the first embodiment, therefore, the thickness of the oxide film 11 is reduced in the etching step to such an extent that the base iron of the stainless steel material 10 is not exposed, thereby to prevent the new oxide film 11 from being naturally generated on the stainless steel material 10, and the thickness of the oxide film 11 can remain uniform.

<Modification Step>

Then, for the stainless steel material 10 having the oxide film 11 of which the thickness is reduced in the etching step, treatment of the modification step is performed to modify the oxide film 11 at the surface into a state suitable for a metal plating process. In the first embodiment, the treatment of the modification step is performed and the stainless steel material 10 is thereby obtained which is covered with the oxide film 11, as illustrated in FIGS. 1 and 2.

Examples of the state suitable for a metal plating process include a state in which the Cr/O value (molar ratio of Cr/O) and Cr/Fe value (molar ratio of Cr/Fe) as measured by the scanning-type Auger electron spectroscopy analysis for the surface of the oxide film 11 are adjusted within the following ranges. That is, the Cr/0 value is preferably within a range of 0.05 to 0.2 and more preferably within a range of 0.05 to 0.15. The Cr/Fe value is preferably within a range of 0.5 to 0.8 and more preferably within a range of 0.5 to 0.7.

In the first embodiment, when the Cr/0 value and Cr/Fe value as measured by Auger electron spectroscopy analysis are controlled within the above ranges on the surface of the oxide film 11 of the stainless steel material 10, the metal plating layer 20 formed on the oxide film 11 can have an improved coverage (i.e., a ratio of an area covered with the metal plating layer 20 to the surface of the oxide film 11 on which the metal plating layer 20 is formed) and can be excellent in the interfacial adhesion property and the corrosion resistance.

In the first embodiment, the Cr/0 value and Cr/Fe value can be measured by Auger electron spectroscopy analysis, for example, using the following method. First, a scanning-type Auger electron spectroscopy analyzer (AES) is used to measure the surface of the oxide film 11, and the atomic percentages of Cr, O, and Fe at the surface of the oxide film 11 are calculated. Five locations at the surface of the oxide film 11 are measured using the scanning-type Auger electron spectroscopy analyzer, and the obtained results may be averaged thereby to calculate the Cr/0 value (at % of Cr/at % of O) and the Cr/Fe value (at % of Cr/at % of Fe). In the first embodiment, among the obtained peaks by the measurement using the scanning-type Auger electron spectroscopy analyzer, a peak given within 510 to 535 eV represents the peak of Cr, a peak given within 485 to 520 eV represents the peak of O, and a peak given within 570 to 600 eV represents the peak of Fe. The atomic percentages of Cr, O, and Fe are to be measured when the sum of Cr, O, and Fe is 100 at %.

In the modification step for modification into a state suitable for the metal plating process of the first embodiment, examples of the method of putting the Cr/0 value and Cr/Fe value as measured by the scanning-type Auger electron spectroscopy analysis into the above ranges include a method of immersing the stainless steel material 10 after the etching step in a sulfuric acid aqueous solution.

When the stainless steel material 10 is immersed in a sulfuric acid aqueous solution in the modification step for modification into a state suitable for the metal plating process, the sulfuric acid concentration in the sulfuric acid aqueous solution is preferably 20 to 25 vol %. The temperature when immersing the stainless steel material 10 is preferably 50° C. to 70° C. and more preferably 60° C. to 70° C. The time for immersing the stainless steel material 10 in the sulfuric acid aqueous solution is preferably 3 to 600 seconds and more preferably 5 to 300 seconds.

According to the first embodiment, when the method is used in which the stainless steel material 10 is immersed in a sulfuric acid aqueous solution in the modification step for modification into a state suitable for the metal plating process, the conditions of the sulfuric acid concentration, temperature, and immersion time are set within the above ranges. Through this setting, a part of the oxide film 11 on the surface of the stainless steel material 10 is removed and the stainless steel material 10 can have a surface of which the Cr/O value and Cr/Fe value as measured by the Auger electron spectroscopy analysis are controlled within the above-described ranges.

In the first embodiment, the stainless steel material 10 having the oxide film 11 of which the thickness has been reduced in the etching step is subjected to the above-described modification step for modification into a state suitable for the metal plating process thereby to have a further reduced thickness of the oxide film 11 in general. For example, with reference to the graphs obtained in the example illustrated in FIG. 2 through the measurement using the scanning-type Auger electron spectroscopy analyzer (AES), the thickness of the oxide film 11 decreases from 9.2 nm after the etching step to 6.7 nm after the modification step for modification into a state suitable for the metal plating process, provided that the thickness of the oxide film 11 is represented by the depth at a position in which the atomic concentration of oxygen (O) falls below the atomic concentration of iron (Fe).

<Metal Plating Step>

Then, for the stainless steel material 10 which is modified by the modification step for modification into a state suitable for the metal plating process, a process of the metal plating step is performed to form a metal plating layer 20 at the surface.

The metal which constitutes the metal plating layer 20 may be, but is not limited to, any one of gold (Au), silver (Ag), palladium (Pd), platinum (Pt), rhodium (Rh), ruthenium (Ru), copper (Cu), tin (Sn), chromium (Cr), nickel (Ni), cobalt (Co), iron (Fe), phosphorus (P), and boron (B) or an alloy that contains two or more of the above metals. Among these, Au, Ag, Pd, or Pt may be particularly preferred. The method of plating for forming the metal plating layer 20 is not particularly limited, but it is preferred to form the metal plating layer 20 by electroless plating using a plating bath that contains a salt of Au, Ag, Pd, Pt, Rh, Ru, Cu, Sn, Cr, Ni, Co, Fe, P, B, and the like.

Au, Ag, Pd, Pt, Rh, Ru, Cu, Sn, Cr, and Ni as mentioned herein have common properties that they are noble metals having a high normal electrode potential and the contact resistance is low. When any of the above metals is used as the metal which constitutes the metal plating layer 20, therefore, the obtained metal-plated stainless material 1 is excellent in the properties, such as plating property, interfacial adhesion property, corrosion resistance, and electrical conductivity, of the metal plating layer 20.

The coverage of the metal plating layer 20, that is, the ratio of an area covered by the metal plating layer 20 to the surface of the oxide film 11 on which the metal plating layer 20 is formed, is preferably 95% or more. When the coverage of the metal plating layer 20 is 95% or more, pinholes in the metal plating layer 20 can be reduced thereby to prevent the delamination of the metal plating layer 20 triggered from such pinholes and to further improve the corrosion resistance and electrical conductivity of the obtained metal-plated stainless material 1.

When gold is used as a primary metal that constitutes the metal plating layer 20, the thickness of the metal plating layer 20 to be formed is preferably 2 to 20 nm and more preferably 2 to 10 nm. If the thickness of the metal plating layer 20 formed primarily of gold is unduly thin, the metal plating layer 20 will not be uniformly formed on the oxide film 11 of the stainless steel material 10, and the corrosion resistance and electrical conductivity of the metal-plated stainless material 1 may possibly deteriorate. On the other hand, an unduly thick thickness of the metal plating layer 20 formed primarily of gold may lead to disadvantages in cost.

When silver is used as a primary metal that constitutes the metal plating layer 20, the thickness of the metal plating layer 20 to be formed is preferably 10 to 200 nm and more preferably 20 to 100 nm. If the thickness of the metal plating layer 20 formed primarily of silver is unduly thin, the metal plating layer 20 will not be uniformly formed on the oxide film 11 of the stainless steel material 10, and the corrosion resistance and electrical conductivity of the metal-plated stainless material 1 may possibly deteriorate. On the other hand, an unduly thick thickness of the metal plating layer 20 formed primarily of silver may lead to disadvantages in cost.

When a metal other than gold and silver is used as a primary metal that constitutes the metal plating layer 20, the thickness of the metal plating layer 20 to be formed is preferably 2 to 20 nm and more preferably 2 to 10 nm. If the thickness of the metal plating layer 20 formed of such a metal is unduly thin, the metal plating layer 20 will not be uniformly formed on the oxide film 11 of the stainless steel material 10, and the corrosion resistance and electrical conductivity of the metal-plated stainless material 1 may possibly deteriorate. On the other hand, an unduly thick thickness of the metal plating layer 20 formed of such a metal may lead to disadvantages in cost.

As the above, the metal-plated stainless material 1 can be obtained through the metal plating step in which the metal plating process is performed for the stainless steel material 10 to form the metal plating layer 20 on the oxide film 11.

According to the first embodiment, the acid treatment step for treatment with the acidic solution and the etching step as described above allow the oxide film 11 to have a uniform thickness even when the stainless steel material 10 prepared as a substrate has a variation in the thickness of a naturally-generated oxide film 11 on the surface (i.e., a variation in the thickness of the oxide film 11 based on the individual difference of the stainless steel material and/or a variation in the thickness of the oxide film 11 on the same surface of a stainless steel material). Specifically, even when the thickness of the oxide film 11 varies in the untreated stainless steel material 10, the oxide film 11 of the stainless steel material 10 can be adjusted to have a uniform thickness through the formation in the acid treatment step for treatment with the acidic solution and the subsequent thickness reduction in the etching step, regardless of the individual difference and variety of the thickness of the oxide film 11 generated on the surface of the stainless steel material 10.

Moreover, according to the first embodiment, for the oxide film 11 thus having a uniform thickness, the above-described modification step for modification into a state suitable for a metal plating process is performed and the oxide film 11 can thereby be brought into the state suitable for a metal plating process. Thereafter, in the metal plating step, the metal plating layer 20 can be formed to have a thin and uniform thickness.

Thus, according to the first embodiment, the oxide film 11 suitable for a metal plating process can be formed to have a uniform thickness regardless of the variation in the oxide film 11 generated on the surface of the stainless steel material 10 and the metal plating layer 20 can be formed on such an oxide film 11 so as to have a thin and uniform thickness. As a result, according to the first embodiment, it is possible to produce a metal-plated stainless material 1 that is excellent in the interfacial adhesion property and corrosion resistance of the metal plating layer 20.

The metal-plated stainless material 1 of the first embodiment can be used as an electrical contact material such as used for connectors, switches, or printed wiring boards, as described above, but may also be used as a separator for fuel cells. Such a separator for fuel cells is used as a member of a fuel cell that constitutes a fuel cell stack, and has a function to supply an electrode with fuel gas or air through gas flow channels and a function to collect electrons generated at the electrode. When the metal-plated stainless material 1 is used as a separator for fuel cells, it is preferred to prepare a stainless steel material 10 of which the surface is preliminarily formed with irregularities (gas flow channels) that function as flow channels for fuel gas or air and perform each treatment or process of the acid treatment step for treatment with the acidic solution, the etching step, the modification step for modification into a state suitable for a metal plating process, and the metal plating step, as described above, for the stainless steel material 10. The method of forming such gas flow channels is not particularly limited, but a method of forming the gas flow channels by press working may be mentioned, for example.

In general, a separator for fuel cells is exposed to an environment of high temperature and acidic atmosphere in the fuel cells. Accordingly, when a stainless steel material formed with a metal plating layer at the surface is used as a separator for fuel cells, if the coverage of the metal plating layer at the surface is low, corrosion of the stainless steel material as a substrate will progress rapidly. This may result in a problem in that the electrical resistance value increases due to the corrosion product generated on the surface of the stainless steel material to deteriorate the function as a separator for fuel cells, that is, the function of collecting electrons generated at the electrode.

In contrast, the metal-plated stainless material 1 according to the first embodiment is formed with the metal plating layer 20 which is excellent in the coverage and interfacial adhesion property as described above, and can be suitably used as such a separator for fuel cells.

Second Embodiment

The metal-plated stainless material 1 of a second embodiment is formed through first performing, as pretreatment, a film thickness reduction step of treating a stainless steel material 10 with an etching treatment agent to reduce the thickness of an oxide film 11 including a passivation film and a film growth step of growing the oxide film 11 using an oxidation treatment agent and then performing a modification step of modifying the oxide film 11 and a metal plating step of forming a metal plating layer on the stainless steel material. Thus, the metal-plated stainless material 1 is configured such that, as illustrated in FIG. 1, the metal plating layer 20 is formed on the oxide film 11 which covers the stainless steel material 10.

<Film Thickness Reduction Step>

In the second embodiment, first, the stainless steel material 10 as a substrate of the metal-plated stainless material 1 is prepared. The substrate to be used may be the same as that in the above-described first embodiment.

Figure 3:
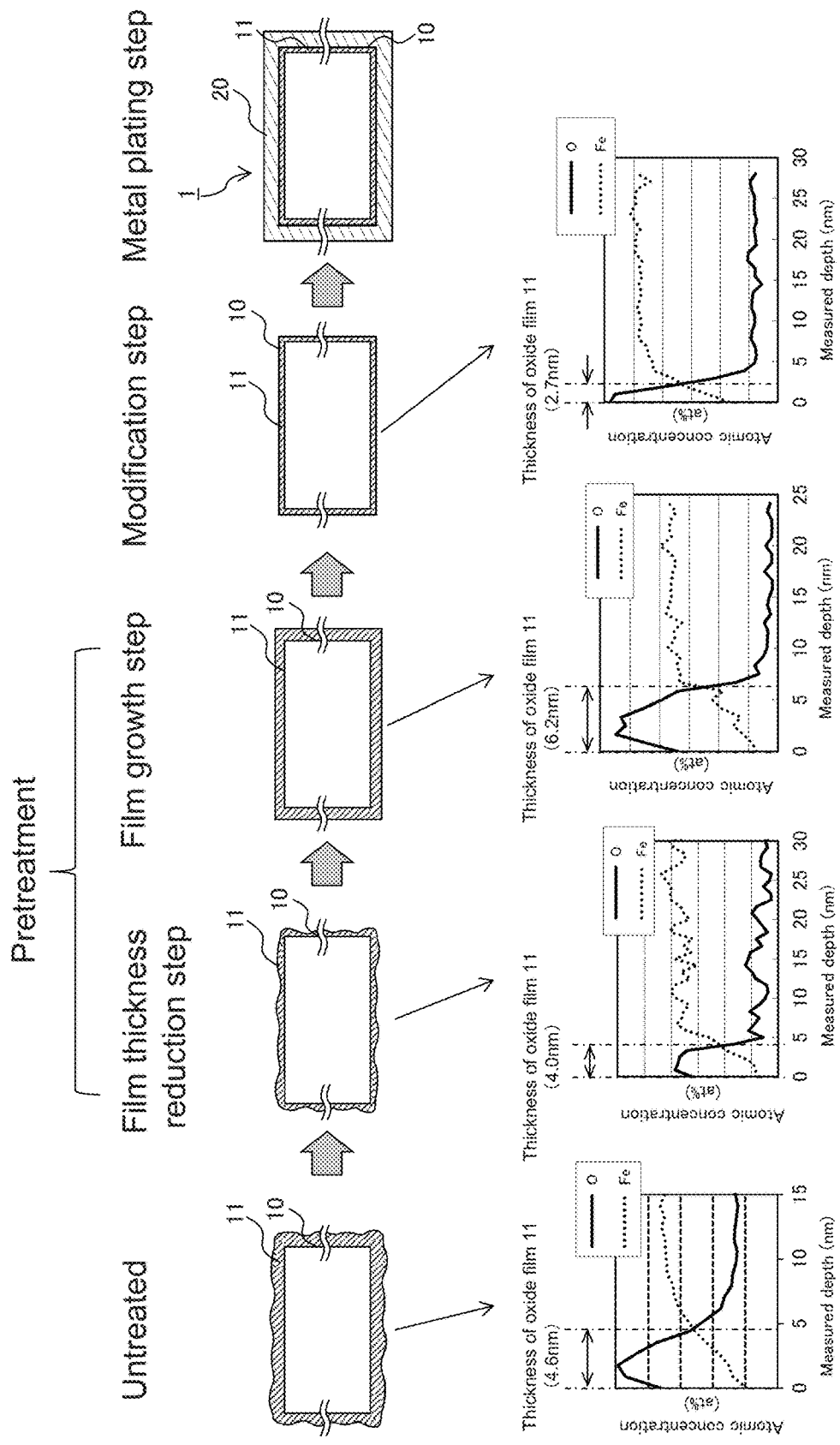
FIG. 3 is a set of views for explaining each step for producing the metal-plated stainless material in the second embodiment of the present invention.

In the second embodiment, for the prepared stainless steel material 10, treatment of the film thickness reduction step is performed in control of a predetermined condition to reduce the thickness of the oxide film 11, which includes a naturally-generated passivation film on the surface, using an etching agent. Specifically, the stainless steel material 10 is brought into contact with the etching agent to remove a part of the oxide film 11 on the surface of the stainless steel material 10 and, as illustrated in FIG. 3, the thickness of the oxide film 11 is reduced. FIG. 3 is a set of views illustrating an example of appearances in which the metal-plated stainless material 1 is formed from the untreated stainless steel material 10 through the film thickness reduction step, film growth step, modification step, and metal plating step. FIG. 3 also illustrates graphs representing variation in atomic concentrations (at %) of oxygen (O) and iron (Fe) when measurement is performed using a scanning-type Auger electron spectroscopy analyzer (AES) for the stainless steel material 10 after the film thickness reduction step, the stainless steel material 10 after the film growth step, and the stainless steel material 10 after the modification step. In FIG. 3, each vertical axis represents the atomic concentration of oxygen (O) or iron (Fe) while each horizontal axis represents the depth when measured from the surface of the stainless steel material 10 using the scanning-type Auger electron spectroscopy analyzer (AES).

In the second embodiment, the treatment is performed in the above manner to bring the prepared stainless steel material 10 (denoted by "Untreated" in FIG. 3) into contact with the etching agent and the thickness of the oxide film 11 at the surface can thereby be reduced, as illustrated in FIG. 3. That is, with reference to the graphs obtained in the example of FIG. 3 through the measurement using the scanning-type Auger electron spectroscopy analyzer (AES), the thickness of the oxide film 11 decreases from 4.6 nm in the untreated state to 4.0 nm after the film thickness reduction step, provided that the thickness of the oxide film 11 is represented by the depth at a position in which the atomic concentration of oxygen (O) falls below the atomic concentration of iron (Fe). In the second embodiment, the oxide film 11 of which the thickness is reduced through the film thickness reduction step has a totally-reduced thickness, as illustrated in FIG. 3.

The etching agent used in the film thickness reduction step is not particularly limited, provided that it can reduce the thickness of the oxide film 11. It is preferred to use any one of ammonium hydrogen fluoride, sulfuric acid, nitric acid, and hydrochloric acid or a mixture thereof, among which ammonium hydrogen fluoride or a mixed acid of hydrochloric acid and nitric acid is particularly preferred.

In the film thickness reduction step, aqueous solution of the above etching agent is brought into contact with the stainless steel material 10, and a part of the oxide film 11 on the surface of the stainless steel material 10 can thereby be removed. The concentration of the etching agent in the aqueous solution is preferably 1 to 99 wt % and may be adjusted to a concentration suitable for use in accordance with the type of the etching agent. In particular, when the treatment is performed using ammonium hydrogen fluoride, the concentration is preferably 1 to 15 wt % and more preferably 3 to 5 wt %. The concentration of the etching agent within the above range allows the thickness of the oxide film 11 of the stainless steel material 10 to be appropriately reduced.

It suffices that the method of bringing the stainless steel material 10 into contact with the etching agent is a method with which the thickness of the oxide film 11 can be appropriately reduced with a uniform thickness as much as possible. Examples of such a method include a method of immersing the stainless steel material 10 in the aqueous solution of the etching agent and a method of spraying the aqueous solution of the etching agent to the stainless steel material 10.

When the stainless steel material 10 is immersed in the aqueous solution of the etching agent, the temperature of the aqueous solution is preferably 20° C. to 60° C. and more preferably 25° C. to 50° C. The time for immersing the stainless steel material 10 in the aqueous solution of the etching agent is preferably 5 to 600 seconds and more preferably 10 to 120 seconds.

In the second embodiment, when a part of the oxide film 11 is removed in the film thickness reduction step, it is preferred not to expose the base iron of the stainless steel material 10 (a base portion of the stainless steel material 10 that is not oxidized to be the oxide film 11). This will be more specifically described. If the base iron of the stainless steel material 10 is exposed, the exposed portion will come into contact with oxygen in the air and/or oxygen in water to naturally generate a new oxide film 11. Such a naturally-generated oxide film 11 is liable to have a nonuniform thickness. In the second embodiment, therefore, the thickness of the oxide film 11 is reduced in the film thickness reduction step to such an extent that the base iron of the stainless steel material 10 is not exposed, thereby to prevent the new oxide film 11 from being naturally generated on the stainless steel material 10.

<Film Growth Step>

Subsequently, treatment of the film growth step is performed to grow the oxide film 11, as illustrated in FIG. 3, through bringing an oxidation treatment agent into contact with the stainless steel material 10 on which the thickness of the oxide film 11 is reduced by the film thickness reduction step.

In the second embodiment, the treatment is performed in the above manner to bring the stainless steel material 10 after the film thickness reduction step into contact with the oxidation treatment agent in control of a predetermined condition, and the oxide film 11 can thereby grow, as illustrated in FIG. 3. That is, with reference to the graphs obtained in the example illustrated in FIG. 3 through the measurement using the scanning-type Auger electron spectroscopy analyzer (AES), the thickness of the oxide film 11 increases from 4.0 nm after the film thickness reduction step to 6.2 nm after the film growth step, provided that the thickness of the oxide film 11 is represented by the depth at a position in which the atomic concentration of oxygen (O) falls below the atomic concentration of iron (Fe).

In the second embodiment, as described above, the oxide film 11 can be grown using the oxidation treatment agent thereby to have an increased and uniform thickness. This will be more specifically described. As illustrated in FIG. 3, in the stainless steel material 10 in which the thickness of the oxide film 11 of the untreated stainless steel material 10 is totally reduced (stainless steel material 10 after the film thickness reduction step), the thickness of the oxide film 11 is nonuniform and, therefore, parts with a thinner oxide film 11 are further readily oxidized while parts with a thicker oxide film 11 are less likely to be oxidized. In contrast, when the surface of the stainless steel material 10 is purposely oxidized using the oxidation treatment agent, the growth of the oxide film 11 to be formed at the parts of the stainless steel material 10 in which the oxidization is easy (parts with a thinner oxide film 11) progresses while the growth of the oxide film 11 to be formed at the parts in which the oxidization is difficult (parts with a thicker oxide film 11) is suppressed. As a result, the entire surface of the stainless steel material 10 is evenly oxidized and the oxide film 11 on the stainless steel material 10 can have a uniform thickness.

In the second embodiment, the above-described film thickness reduction step and film growth step are performed, and the thickness of the oxide film 11 on the surface of the stainless steel material 10 can thereby be purposely uniform. Thus, according to the second embodiment, a metal plating layer 20 can be successfully formed on the obtained stainless steel material covered with the oxide layer and it is possible to produce a metal-plated stainless material 1 that is excellent in the interfacial adhesion property and corrosion resistance of the metal plating layer 20.

The oxidation treatment agent used in the film growth step is not particularly limited, provided that the oxide film 11 can be appropriately grown, but it is preferred to use any one of nitric acid and sulfuric acid or a mixture thereof, among which nitric acid is particularly preferred.

In the film growth step, aqueous solution of the above oxidation treatment agent is brought into contact with the stainless steel material 10, and the surface of the stainless steel material 10 can thereby be oxidized. The concentration of the oxidation treatment agent in the aqueous solution is preferably 5 to 25 wt % and more preferably 15 to 20 wt %. When the concentration of the oxidation treatment agent is within the above range, the surface of the stainless steel material 10 can be appropriately oxidized.

It suffices that the method of bringing the stainless steel material 10 into contact with the oxidation treatment agent is a method with which the oxide film 11 can grow with its uniform thickness as much as possible. Examples of such a method include a method of immersing the stainless steel material 10 in the aqueous solution of the oxidation treatment agent and a method of spraying the aqueous solution of the oxidation treatment agent to the stainless steel material 10.

When the stainless steel material 10 is immersed in the aqueous solution of the oxidation treatment agent, the temperature of the aqueous solution is preferably 20° C. to 60° C. and more preferably 25° C. to 40° C. The time for immersing the stainless steel material 10 in the aqueous solution of the oxidation treatment agent is preferably 1 to 30 seconds and more preferably 2 to 15 seconds.

<Modification Step>

Then, for the stainless steel material 10 of which the oxide film 11 grows in the film growth step, treatment of the modification step is performed to modify the oxide film 11 at the surface into a state suitable for a metal plating process, as in the first embodiment. In the second embodiment, the treatment of the modification step is performed and the stainless steel material 10 is thereby obtained which is covered with the oxide film 11, as illustrated in FIGS. 1 and 3.

Examples of the state suitable for a metal plating process include a state in which the Cr/O value (molar ratio of Cr/O) and Cr/Fe value (molar ratio of Cr/Fe) as measured by the scanning-type Auger electron spectroscopy analysis for the surface of the oxide film 11 are adjusted within the following ranges. That is, the Cr/O value is preferably within a range of 0.05 to 0.2 and more preferably within a range of 0.05 to 0.15. The Cr/Fe value is preferably within a range of 0.5 to 0.8 and more preferably within a range of 0.5 to 0.7.

In the second embodiment, when the Cr/O value and Cr/Fe value as measured by Auger electron spectroscopy analysis are controlled within the above ranges on the surface of the oxide film 11 of the stainless steel material 10, the metal plating layer 20 formed on the oxide film 11 can have an improved coverage (i.e., a ratio of an area covered with the metal plating layer 20 to the surface of the oxide film 11 on which the metal plating layer 20 is formed) and can be excellent in the interfacial adhesion property and the corrosion resistance.

In the second embodiment, the Cr/O value and Cr/Fe value can be measured by Auger electron spectroscopy analysis, for example, using the following method. First, a scanning-type Auger electron spectroscopy analyzer (AES)

is used to measure the surface of the oxide film 11, and the atomic percentages of Cr, O, and Fe at the surface of the oxide film 11 are calculated. Five locations at the surface of the oxide film 11 are measured using the scanning-type Auger electron spectroscopy analyzer, and the obtained results may be averaged thereby to calculate the Cr/O value (at % of Cr/at % of O) and the Cr/Fe value (at % of Cr/at % of Fe). In the second embodiment, among the obtained peaks by the measurement using the scanning-type Auger electron spectroscopy analyzer, a peak given within 510 to 535 eV represents the peak of Cr, a peak given within 485 to 520 eV represents the peak of O, and a peak given within 570 to 600 eV represents the peak of Fe. The atomic percentages of Cr, O, and Fe are to be measured when the sum of Cr, O, and Fe is 100 at %.

In the modification step of the second embodiment, examples of the method of putting the Cr/0 value and Cr/Fe value as measured by the scanning-type Auger electron spectroscopy analysis into the above ranges include a method of immersing the stainless steel material 10 after the film growth step in a sulfuric acid aqueous solution.

When the stainless steel material 10 is immersed in a sulfuric acid aqueous solution in the modification step, the sulfuric acid concentration in the sulfuric acid aqueous solution is preferably 20 to 25 vol %. The temperature when immersing the stainless steel material 10 is preferably 50° C. to 70° C. and more preferably 60° C. to 70° C. The time for immersing the stainless steel material 10 in the sulfuric acid aqueous solution is preferably 3 to 600 seconds and more preferably 5 to 300 seconds.

According to the second embodiment, when the method is used in which the stainless steel material 10 is immersed in a sulfuric acid aqueous solution in the modification step, the conditions of the sulfuric acid concentration, temperature, and immersion time are set within the above ranges. Through this setting, a part of the oxide film 11 on the surface of the stainless steel material 10 is removed and the stainless steel material 10 can have a surface of which the Cr/O value and Cr/Fe value as measured by the Auger electron spectroscopy analysis are controlled within the above-described ranges.

In the second embodiment, the stainless steel material 10 of which the oxide film 11 has grown in the film growth step is subjected to the above-described modification step thereby to have a reduced thickness of the oxide film 11 in general. For example, with reference to the graphs obtained in the example illustrated in FIG. 3 through the measurement using the scanning-type Auger electron spectroscopy analyzer (AES), the thickness of the oxide film 11 decreases from 6.2 nm after the film growth step to 2.7 nm after the modification step, provided that the thickness of the oxide film 11 is represented by the depth at a position in which the atomic concentration of oxygen (O) falls below the atomic concentration of iron (Fe).

<Metal Plating Step>

Then, for the stainless steel material 10 which is modified by the modification step, a process of the metal plating step is performed to form a metal plating layer 20 at the surface, as in the above-described first embodiment. The metal-plated stainless material 1 can thus be obtained through the metal plating step in which the metal plating process is performed for the stainless steel material 10 to form the metal plating layer 20 on the oxide film 11.

According to the second embodiment, the film thickness reduction step and the film growth step allow the oxide film 11 to have a uniform thickness even when the stainless steel material 10 prepared as a substrate has a variation in the thickness of a naturally-generated oxide film 11 on the surface (i.e., a variation in the thickness of the oxide film 11 based on the individual difference of the stainless steel material and/or a variation in the thickness of the oxide film 11 on the same surface of a stainless steel material). Specifically, even when the thickness of the oxide film 11 varies in the untreated stainless steel material 10, the oxide film 11 of the stainless steel material 10 can be adjusted to have a uniform thickness through the reduction of the thickness in the film thickness reduction step and the subsequent increase of the thickness in the film growth step, regardless of the individual difference and variety of the thickness of the oxide film 11 generated on the surface of the stainless steel material 10.

Moreover, according to the second embodiment, for the oxide film 11 thus having a uniform thickness, the above-described modification step is performed and the oxide film 11 can thereby be brought into the state suitable for a metal plating process. Thereafter, in the metal plating step, the metal plating layer 20 can be formed to have a thin and uniform thickness.

Thus, according to the second embodiment, the oxide film 11 suitable for a metal plating process can be formed to have a uniform thickness regardless of the variation in the oxide film 11 generated on the surface of the stainless steel material 10 and the metal plating layer 20 can be formed on such an oxide film 11 so as to have a thin and uniform thickness. As a result, according to the second embodiment, it is possible to produce a metal-plated stainless material 1 that is excellent in the interfacial adhesion property and corrosion resistance of the metal plating layer 20.

The metal-plated stainless material 1 of the second embodiment can be used not only as an electrical contact material such as used for connectors, switches, or printed wiring boards, as in the above-described first embodiment, but also as a separator for fuel cells. The metal-plated stainless material 1 according to the second embodiment is formed with the metal plating layer 20 which is excellent in the coverage and interfacial adhesion property as described above, and can be suitably used as a separator for fuel cells.

EXAMPLES

Hereinafter, the present invention will be more specifically described with reference to examples, but the present invention is not limited to these examples.

Evaluation method for the metal-plated stainless material 1 obtained in each of the examples and comparative example is as follows.

<Measurement of Contact Resistance Value>

Figure 4:
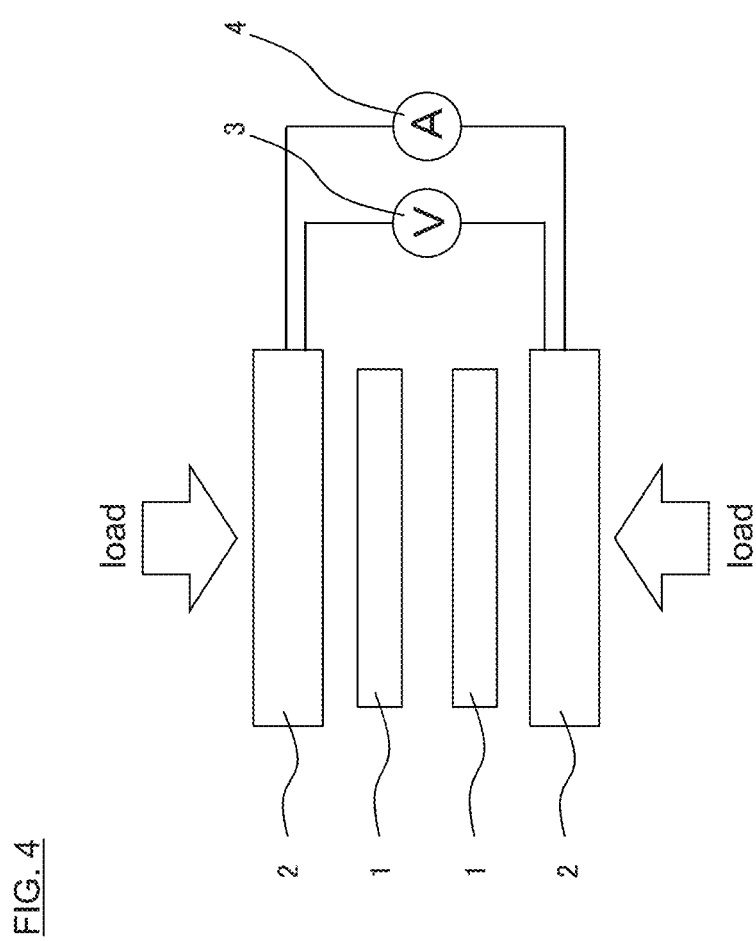
FIG. 4 is a view for explaining a method of measuring the contact resistance of a metal-plated stainless material 1 obtained in examples and comparative examples.

For the metal-plated stainless material 1, measurement of the contact resistance value was performed using a measurement system as illustrated in FIG. 4. The measurement system illustrated in FIG. 4 is composed of two metal-plated stainless materials 1, gold-plated copper electrodes 2, a voltmeter 3, and an ammeter 4. Specifically, for the measurement of the contact resistance value, the metal-plated stainless materials 1 were first worked into a size of width of 20 mm, length of 20 mm, and thickness of 0.1 mm. Two of the metal-plated stainless materials 1 were overlapped each other and interposed between the gold-plated copper electrodes 2 from both sides to be fixed, and the measurement system was thus obtained as illustrated in FIG. 4. Then, the contact resistance value of the test pieces was measured using an ohm meter (Milli-Ohm HiTESTER 3540 available from HIOKI E.E. CORPORATION) while applying a constant load to the gold-plated copper electrodes 2.

Example 1

First, a plate of SUS316L was prepared as the stainless steel material 10. Then, the prepared stainless steel material 10 was washed with water and degreased and thereafter treatment was performed such that the stainless steel material 10 was immersed in a hydrochloric acid aqueous solution of a hydrochloric acid concentration of 20 wt % under a condition of a temperature of 60° C. and an immersion time of 60 seconds (treatment of the acid treatment step for treatment with an acidic solution) thereby to form the oxide film 11 on the surface of the stainless steel material 10.

Next, the stainless steel material 10 formed with the oxide film 11 was washed with water and thereafter treatment was performed such that the stainless steel material 10 was immersed in a nitric acid aqueous solution of a nitric acid concentration of 20 wt % under a condition of a temperature of 30° C. and an immersion time of 3 seconds (treatment of the etching step) thereby to reduce the thickness of the oxide film 11 on the surface of the stainless steel material 10.

Subsequently, the stainless steel material 10 formed with the oxide film 11 having the reduced thickness was washed with water and thereafter treatment was performed such that the stainless steel material 10 was immersed in a sulfuric acid aqueous solution of a sulfuric acid concentration of 25 vol % under a condition of a temperature of 70° C. and an immersion time of 5 seconds (treatment of the modification step for modification into a state suitable for a metal plating process) thereby to modify the oxide film 11 on the surface of the stainless steel material 10.

Then, the stainless steel material 10 formed with the modified oxide film 11 was washed with water and thereafter treatment of electroless plating was performed under a condition of 38° C., pH of 5.5, and 4 minutes using an electroless palladium alloy plating bath (treatment of the metal plating step) thereby to form the metal plating layer 20 of a thickness of about 40 nm on the oxide film 11. The metal-plated stainless material 1 was thus obtained.

Subsequently, for the obtained metal-plated stainless material 1, the measurement of the contact resistance was performed in accordance with the above-described method. Furthermore, heat treatment was performed to maintain the metal-plated stainless material 1 under an environment of a temperature of 250° C. for 1 hour and the measurement of the contact resistance was performed again. Results are listed in Table 1.

Example 2

First, SUS316L was prepared as the stainless steel material 10. Then, the prepared stainless steel material 10 was washed with water and degreased and thereafter treatment was performed such that the stainless steel material 10 was immersed in an ammonium hydrogen fluoride aqueous solution of an ammonium hydrogen fluoride concentration of 3 wt % under a condition of a temperature of 30° C. and an immersion time of 60 seconds (treatment of the film thickness reduction step) thereby to reduce the thickness of the oxide film 11 on the surface of the stainless steel material 10.

Next, the stainless steel material 10 formed with the oxide film 11 having the reduced thickness was washed with water and thereafter treatment was performed such that the stainless steel material 10 was immersed in a nitric acid aqueous solution of a nitric acid concentration of 20 wt % under a condition of a temperature of 30° C. and an immersion time of 3 seconds (treatment of the film growth step) thereby to grow the oxide film 11 on the surface of the stainless steel material 10.

Subsequently, the stainless steel material 10 formed with the grown oxide film 11 was washed with water and thereafter treatment was performed such that the stainless steel material 10 was immersed in a sulfuric acid aqueous solution of a sulfuric acid concentration of 25 vol % under a condition of a temperature of 70° C. and an immersion time of 5 seconds (treatment of the modification step) thereby to modify the oxide film 11 on the surface of the stainless steel material 10.

Then, the stainless steel material 10 formed with the modified oxide film 11 was washed with water and thereafter treatment of electroless plating was performed under a condition of pH of 5.5, 38° C., and 4 minutes using an electroless palladium alloy plating bath (treatment of the metal plating step) thereby to form the metal plating layer 20 of a thickness of about 40 nm on the oxide film 11. The metal-plated stainless material 1 was thus obtained.

Subsequently, for the obtained metal-plated stainless material 1, the measurement of the contact resistance was performed in accordance with the above-described method. Furthermore, heat treatment was performed to maintain the metal-plated stainless material 1 under an environment of a temperature of 250° C. for 1 hour and the measurement of the contact resistance was performed again. Results are listed in Table 1.

Example 3

First, SUS316L was prepared as the stainless steel material 10. Then, the prepared stainless steel material 10 was washed with water and degreased and thereafter treatment was performed such that the stainless steel material 10 was immersed in an aqueous solution mixed with hydrochloric acid of a hydrochloric acid concentration of 18 wt % and nitric acid of a nitric acid concentration of 1 wt % under a condition of a temperature of 40° C. and an immersion time of 15 seconds (treatment of the film thickness reduction step) thereby to reduce the thickness of the oxide film 11 on the surface of the stainless steel material 10.

Next, the stainless steel material 10 formed with the oxide film 11 having the reduced thickness was washed with water and thereafter treatment was performed such that the stainless steel material 10 was immersed in a nitric acid aqueous solution of a nitric acid concentration of 20 wt % under a condition of a temperature of 30° C. and an immersion time of 3 seconds (treatment of the film growth step) thereby to grow the oxide film 11 on the surface of the stainless steel material 10.

Subsequently, the stainless steel material 10 formed with the grown oxide film 11 was washed with water and thereafter treatment was performed such that the stainless steel material 10 was immersed in a sulfuric acid aqueous solution of a sulfuric acid concentration of 25 vol % under a condition of a temperature of 70° C. and an immersion time of 5 seconds (treatment of the modification step) thereby to modify the oxide film 11 on the surface of the stainless steel material 10.

Then, the stainless steel material 10 formed with the modified oxide film 11 was washed with water and thereafter treatment of electroless plating was performed under a condition of pH of 5.5, 38° C., and 4 minutes using an electroless palladium alloy plating bath (treatment of the metal plating step) thereby to form the metal plating layer 20 of a thickness of about 40 nm on the oxide film 11. The metal-plated stainless material 1 was thus obtained.

Subsequently, heat treatment was performed to maintain the obtained metal-plated stainless material 1 under an environment of a temperature of 250° C. for 1 hour and the measurement of the contact resistance was performed in accordance with the above-described method. Results are listed in Table 1.

Comparative Example 1

A metal-plated stainless material was produced in the same manner as in Example 1 except that the treatment of immersing the stainless steel material 10 in a hydrochloric acid aqueous solution (treatment of the acid treatment step for treatment with an acidic solution) was not performed, and the measurement of the contact resistance was performed in the same manner as the above. Results are listed in Table 1.
[Table 1]

TABLE 1

|  | Contact resistance (mΩ) before heat | Contact resistance (mΩ) after heat |
|---|---|---|
| Example 1 | 4.1 | 4.1 |
| Example 2 | 5.4 | 6.1 |
| Example 3 | — | 4.0 |
| Comparative Example 1 | 5.8 | 60.1 |

From the results of Table 1, it has been confirmed that, in Example 1 in which the metal-plated stainless material 1 is produced through the acid treatment step for treatment with an acidic solution, the etching step, and the modification step for modification into a state suitable for a metal plating process as described above, both the contact resistance value before the heat treatment and the contact resistance value after the heat treatment are 4.1 mΩ and the contact resistance value does not vary even after the heat treatment. Also from the results of Table 1, it has been confirmed that, in Example 2 in which the metal-plated stainless material 1 is produced through the above-described film thickness reduction step, film growth step, and modification step, the contact resistance value before the heat treatment is 5.4 mΩ while the contact resistance value after the heat treatment is 6.1 mΩ, and the contact resistance value hardly vary even after the heat treatment. Similarly, from the results of Table 1, it has been confirmed that, in Example 3 in which the metal-plated stainless material 1 is produced through the above-described film thickness reduction step, film growth step, and modification step, the contact resistance value after the heat treatment is 4.0 mΩ, and the contact resistance value is low even after the heat treatment. If, in the metal-plated stainless material 1, the formation of the metal plating layer 20 is insufficient and a part of the stainless steel material 10 is exposed, chromium oxide and/or iron oxide will be formed at the exposed part of the stainless steel material 10 due to the heat treatment to increase the contact resistance value of the metal-plated stainless material 1. In this context, it has been confirmed that the stainless steel material 10 is not exposed and the metal plating layer 20 is successfully formed in the metal-plated stainless materials 1 of Examples 1 and 2 because the contact resistance value does not increase even when the heat treatment is applied. It has also been confirmed that the stainless steel material 10 is not exposed and the metal plating layer 20 is successfully formed in the metal-plated stainless material 1 of Example 3 because the low contact resistance value can be maintained even when the heat treatment is applied.

In contrast, from the results of Table 1, it has been confirmed that, in Comparative Example 1 in which the metal-plated stainless material is produced without the acid treatment step for treatment with an acidic solution, the contact resistance value before the heat treatment is 5.8 mΩ whereas the contact resistance value after the heat treatment is 60.1 mΩ, and the contact resistance value increases due to the heat treatment. It has thus been confirmed that the increase in the contact resistance value due to the exposure of the stainless steel material 10 is found in the metal-plated stainless material produced without the step of treatment with an acidic solution and the formation of the metal plating layer 20 is insufficient.

DESCRIPTION OF REFERENCE NUMERALS

1 Metal-plated stainless material
10 Stainless steel material
11 Oxide film
20 Metal plating layer

The invention claimed is:

1. A method for producing a metal-plated stainless material, the method comprising:
performing an acid treatment of treating a stainless steel material with an acidic solution;
performing an etching of treating the stainless steel material after the acid treatment with an etching treatment agent; and
modifying a surface of the stainless steel material into a state suitable for a metal plating process, wherein
the modifying includes immersing the stainless steel material in a sulfuric acid aqueous solution, and
the acid treatment comprises treating the stainless steel material with the acidic solution thereby to form an oxide film, wherein the oxide film has a lower density than that of a passivation film existing on the surface of the stainless steel material before the acid treatment.

2. The method for producing a metal-plated stainless material according to claim 1, wherein the acid treatment includes treating the stainless steel material with the acidic solution thereby to grow an oxide film thicker than that before the acid treatment, wherein the oxide film includes the passivation film on the surface of the stainless steel material.

3. The method for producing a metal-plated stainless material according to claim 1, wherein the acidic solution comprises a solution that contains any one of hydrochloric acid, ammonium hydrogen fluoride, sulfuric acid, and nitric acid or a mixture thereof.

4. The method for producing a metal-plated stainless material according to claim 1, wherein the etching treatment agent comprises any one of nitric acid and sulfuric acid or a mixture thereof.

5. The method for producing a metal-plated stainless material according to claim 1, wherein the modifying includes immersing the stainless steel material in a sulfuric acid aqueous solution at a temperature of 50° C. to 70° C. for 5 to 600 seconds, wherein the sulfuric acid aqueous solution has a sulfuric acid concentration of 20 to 25 vol %.

6. The method for producing a metal-plated stainless material according to claim 1, further comprising
performing a metal plating for the stainless steel material after the modifying.

7. A method for producing a metal-plated stainless material, the method comprising:

performing a film thickness reduction of reducing a thickness of an oxide film generated on a surface of a stainless steel material using an etching agent;

performing a film growth of growing the thickness-reduced oxide film using an oxidation treatment agent; and modifying the surface of the stainless steel material of which the oxide film grows in the film growth step into a state suitable for a metal plating process, wherein the modifying includes immersing the stainless steel material in a sulfuric acid aqueous solution.

8. The method for producing a metal-plated stainless material according to claim 7, wherein the etching agent comprises any one of ammonium hydrogen fluoride, sulfuric acid, nitric acid, and hydrochloric acid or a mixture thereof.

9. The method for producing a metal-plated stainless material according to claim 7, wherein the oxidation treatment agent comprises any one of nitric acid and sulfuric acid or a mixture thereof.

10. The method for producing a metal-plated stainless material according to claim 7, wherein the modifying includes immersing the stainless steel material in a sulfuric acid aqueous solution at a temperature of 50° C. to 70° C. for 5 to 600 seconds, wherein the sulfuric acid aqueous solution has a sulfuric acid concentration of 20 to 25 vol %.

11. The method for producing a metal-plated stainless material according to claim 7, further comprising performing a metal plating for the stainless steel material after the modifying.

12. The method for producing a metal-plated stainless material according to claim 7, wherein the etching agent comprises ammonium hydrogen fluoride.

* * * * *